(12) United States Patent
Gunnarsson

(10) Patent No.: US 6,246,356 B1
(45) Date of Patent: Jun. 12, 2001

(54) OMNIDIRECTIONAL TRANSPONDER

(75) Inventor: Staffan Gunnarsson, Hässelby (SE)

(73) Assignee: Tagmaster AB, Kista (SE)

( * ) Notice: Subject to any disclaimer, the term of this patent is extended or adjusted under 35 U.S.C. 154(b) by 0 days.

(21) Appl. No.: 09/308,778

(22) PCT Filed: Nov. 18, 1997

(86) PCT No.: PCT/SE97/01931

§ 371 Date: Jul. 30, 1999

§ 102(e) Date: Jul. 30, 1999

(87) PCT Pub. No.: WO98/23971

PCT Pub. Date: Jun. 4, 1998

(30) Foreign Application Priority Data

Nov. 26, 1999 (SE) .................................................. 9604346

(51) Int. Cl.[7] ............................ G01S 13/74; G01S 13/80; H04B 1/58; H01Q 9/04
(52) U.S. Cl. .................................. 342/51; 342/42; 342/43
(58) Field of Search ............................. 342/42–51, 29–41

(56) References Cited

U.S. PATENT DOCUMENTS

| 4,922,259 | 5/1990 | Hall et al. |
| 5,258,762 | 11/1993 | Cabon et al. |
| 5,552,790 | 9/1996 | Gunnarsson . |
| 5,619,207 | 4/1997 | D'Hont . |
| 5,771,021 | * 6/1998 | Veghte et al. ............... 342/51 X |
| 5,825,329 | * 10/1998 | Veghte et al. ............... 342/51 X |

FOREIGN PATENT DOCUMENTS

| 60-334565 | * 12/1994 | (JP) . |
| 9209906A1 | 6/1992 | (WO) . |

* cited by examiner

*Primary Examiner*—Bernarr E. Gregory

(57) ABSTRACT

A transponder for automatic identification and corresponding systems. The transponder may include patch antennas for reflecting transponder data as information sidebands of a microwave signal received from a reading unit, for example. The antennas may by parallel to, but oppositely directed from one another. Additionally the antennas may act against at least one intermediate earth plane, and are linearly polarized so that their polarization direction is rotated through 90° in relation thereto. In this arrangement, the transponder may be read from a short distance and from both sides of the antennas, and communication with the transponder may not be disturbed by the presence of a rearwardly-located reflection plane.

21 Claims, 2 Drawing Sheets

OMNIDIRECTIONAL TRANSPONDER

This application is the national phase under 35 U.S.C. §371 of PCT International Application No. PCT/SE97/01931 which has an International filing date of Nov. 18, 1997 which designated the United States of America.

BACKGROUND OF THE INVENTION

1. Field of the Invention

The present invention relates to a microwave transponder for automatic identification systems that have a back scatter function.

2. Related Art

A back scatter system can be defined as a system in which the data carrier, the so-called transponder, includes antennas and modulation circuits. These components modulate information sidebands with the data to be read from a microwave signal falling on the transponder from a reading unit, thus generating a reflected signal containing information for reception and decoding by the reading unit, without supplying fresh energy. Certain embodiments also enable data to be written into the transponder by modulating the amplitude of the signal from the reading unit with detection data, and memory programming in the transponder. This technique is well known and will not therefore be described in detail here.

One problem with microwave-based transponders of this kind, i.e. transponders that operate at 0.9 GHz and even higher frequencies, is that they are normally unable to communicate omnidirectionally, due to the directivity of the antenna system embodied in the transponder. This makes it necessary to orientate the transponder so that a given side of the transponder will face towards the reading unit, which is difficult to achieve when, e.g., the receiving unit is concealed in a package, a handbag, pocket or like receptacle.

Although the earth plane can be reduced to approximately the same size as the antenna plane with the aid of a patch antenna, so as to obtain equal sensitivity in both forward and rearward directions, transponder readings may become sensitive to reflections from a rearwardly lying reflection plane, should this plane be located at a distance that causes leakage of the information carrying signal from the transponder antenna through the signal reflected via the reflection plane. Packaged objects contained in handbags and the like are often reflective and cause uncertain readings. The same applies to the human body, when the transponder is carried in a pocket.

The necessity of taking into consideration the orientation of the data carrier and its proximity to surrounding objects in order to obtain positive readings is a troublesome limitation in each of these cases. Transponders equipped with dipolar antennas are subjected to similar problems, since these transponders are also influenced by the possible presence of a reflection plane in the proximity of the antenna.

Another drawback with antennas of this type is their low antenna gain, i.e. only a minor part of the incident signal is reflected back to the reading unit, due to lack of directivity, which shortens the range of the system.

SUMMARY OF THE INVENTION

The present invention fully solves these problems and provides a transponder that can be read from a short distance and from both sides of the antenna.

In accordance with one preferred embodiment, there is provided a transponder with which communication will not be disturbed by the presence of a rearwardly located reflection plane.

The present invention thus relates to a transponder which is adapted for use in automatic identifying systems and like systems, wherein the transponder includes a patch antenna which functions to reflect transponder data in the form of information sidebands to a microwave signal falling on the patch antenna and sent from a reading unit, and wherein the transponder is characterized in that it includes two mutually parallel but oppositely directed path antennas.

In one preferred embodiment, the transponder obtains an almost fully isotropic function. In other words, this means that it can be in communication with in all directions in the absence of the troublesome neutral settings found, for instance, in the rod directions of dipoles. Corresponding blind directions are, of course, also found with patch antennas that have a small earth plane, since isotropic antennas are theoretically impossible.

In another particular embodiment of the invention, data can be written into the transponder, e.g., by coding amplitude modulation of the microwave signal, e.g. with a so-called Manchester code, with the data to be written. Such a bit stream in the form of an amplitude modulated microwave signal is captured by detection circuits in the transponder, rectified, amplified and caused to influence the memory register of the transponder.

The present invention employs two patch antennas that operate from respective sides of a common earth plane, or alternatively towards mutually separate earth planes that are separated solely by means of a thin foil. In one aspect of the invention, each of these two antennas is provided with an individual modulation circuit that is supplied from a common application-specific integrated circuit (ASIC), in which the transponder data is stored. This antenna is turned towards the reading unit and reflects signals back to said unit with a directivity, or beaming effect, that provides a very good range.

This enables the transponder to be read from both directions. It also enables the transponder to be produced cheaply, e.g. by laminating the antenna in a known manner. Another advantage is that the ASIC, which is often the most expensive component of the transponder, is common to both antennas.

Accordingly, two separate antennas are employed which, in one preferred embodiment, are not mutually coupled by microwave techniques, but are, instead, mutually connected to respective modulation circuits by low-frequency signal conductors. Because no microwave connection is required between the two antennas, the transponder can be manufactured much more simply.

In another particular embodiment, the transponder is communicated with circular-polarized microwaves, which further enhances the orientation tolerance. One of the antennas may be turned through 90° when the antenna are linearly polarized and in communication with circular-polarized signals. This provides additional freedom on orientation, since only the E-field and not the H-field has neutral settings in a transponder with a small earth plane. The E-field and H-field from patch antennas with a small earth plane are disclosed in the literature, from which the effect referred to is clearly apparent.

The directional characteristic of the transponder is essentially the same, irrespective of whether it is read or written, and consequently remarks concerning reading of the transponder will also apply to writing in the transponder.

With the intention of reducing the size of the transponder, its battery can be placed within the circle circumscribed by the patch antennas, instead of on one side thereof.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION

Figure 1:
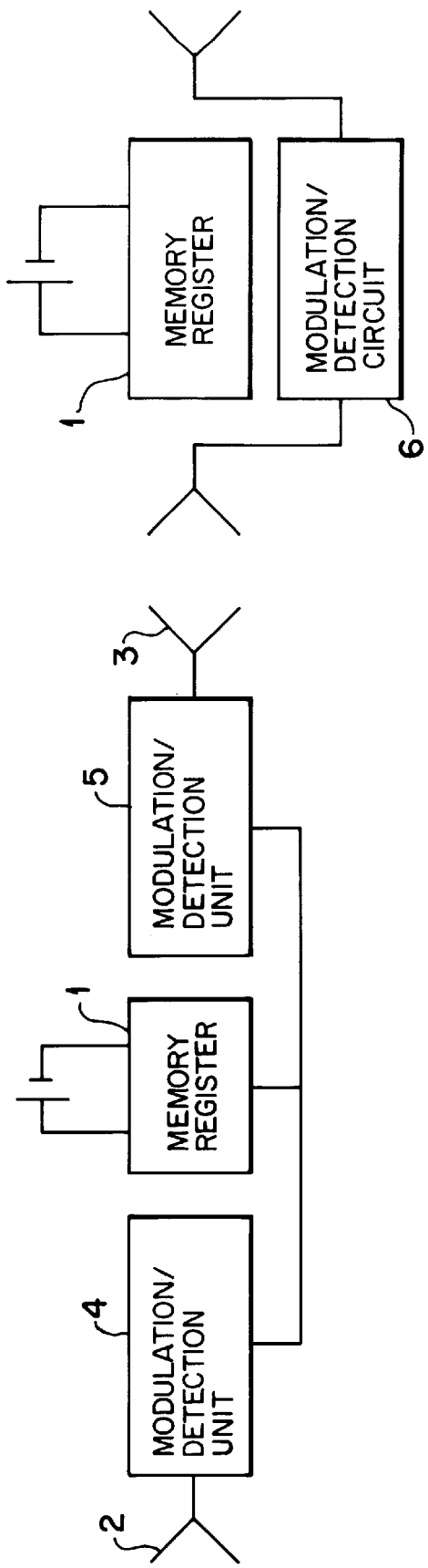
FIG. 1 is a block schematic illustrating two versions of the transponder.

FIG. 1 is a schematic diagram illustrating two versions of the transponders. The transponder shown to the left of FIG. 1 differs from known transponders insomuch that electronics and memory register 1 supply two patch antennas 2, 3 that are placed concentrically together, but with the antenna planes directed 180° from each other.

In the transponder to the left of FIG. 1, each of the antennas utilizes its modulation/detection circuits 4, 5, whereas the transponder shown to the right utilizes a common modulation/detection circuit 6. Both transponder types have principly the same function. The left-hand transponder is simpler to implement, but at the cost of an extra modulation element 4 or 5.

The technology of back scatter transponders is well known, with an incident microwave signal on which information sidebands are formed by virtue of the modulation components 4 and/or 5 periodically changing the antenna impedance in accordance with the data pattern from the memory register in block 1, such that the incident signal will be reflected in different ways depending on whether a zero or a one is outputted. The modulation components 4, 5, 6 may comprise a diode, a field effect transistor or some other non-linear element that can be controlled from block 1.

When the transponder is a writable transponder, i.e. when data in the incident microwave signal can be written into the memory register in block 1, the modulation components 4 and 5 may consist of a diode. Separate components may alternatively be used for detecting and modulation, although this technology is known and will not be discussed here.

Because the antennas 2 and 3 are each directed in a particular direction, the transponder is able to reflect its information sideband, irrespective of whether the microwave signal from a reading unit falls from the right or the left in FIG. 1.

When the antennas have the form of patch antennas with a given directivity, i.e. when their earth planes are made larger than the antenna plane, the strength of the reflection will be stronger and the reading and/or writing range of the transponder longer.

Another advantage afforded by an earth plane that is larger than the antenna planes is that the transponder can be placed in the immediate proximity of a reflection plane without disturbing the function to any great extent. If this was not so, there is a danger that transponder communication will be uncertain when the transponder is placed, e.g., on or in the vicinity of a reflecting object in a bag or the like, due to the fact that the reflecting signal will be totally or partially extinguished by the signal reflected via the reflection plane.

Patch antennas that have small earth planes, i.e. with a lateral extension that lies between the own extension of the antenna element and its double-extension, have a directivity and back lobe that gradually transforms from a lobe breadth of about 90°, and a very small back lobe to a lobe width of 360°, i.e. the back lobe is equally as large as the front lobe.

Of course, zero settings are found in a blind axis in all antennas, even if the earth plane is small. Otherwise, the antennas would be isotropic, which is a physical impossibility. These zero settings, however, only occur in an axis along the E-field of the antenna plane, while sensitivity is retained in all directions in the H-field of the antenna plane when the earth plane is small.

Figure 2:
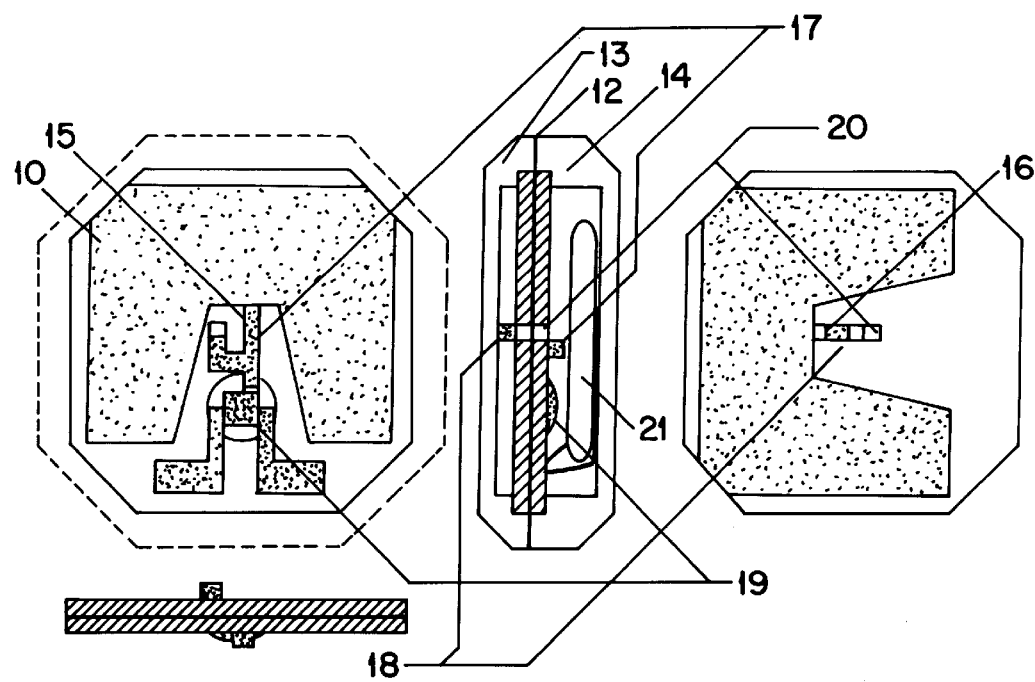
FIG. 2 illustrates and an exemplary embodiment of the invention.

FIG. 2 illustrates an exemplary embodiment in accordance with the invention. Consequently, the inventive embodiment illustrated in FIG. 2, in which the two antenna planes are rotated through 90° in relation to one another, provides a transponder that has an almost isotropic function. When reading is effected with a unit that is circular-polarized, so that it is able to irradiate and receive transponder information sidebands irrespective of the direction in which its linear-polarized antenna is orientated, a highly effective omnidirectional transponder-reading has been achieved.

Because the earth plane is slightly greater than the antenna plane, the inventive transponder is relatively insensitive to being placed on a reflection plane, meaning that the back lobe from respective elements and its reflection in a rearwardly lying reflection plane will be moderate and in practice unharmful to the direct reflected wave.

Thus, in this embodiment of the invention, the size of the earth plane is adapted so that the transponder will not be sensitive to placement on reflection planes, whilst obtaining an almost isotropic function at the same time.

FIG. 2 thus shows the two antenna planes 10, 11 rotated through 90° in relation to one another in order to eliminate blind directions in accordance with the aforegoing. Each of the antennas acts against an earth plane 12, which may be common to both antennas or, for practical reasons, separated by a foil which may be conductive or insulating. This foil may be provided with an adhesive to enable the two covers 13, 14 of the transponder to be joined together.

There is nothing to prevent the earth planes 12 from being separate planes, provided that they are not spaced too far apart, so as to disturb the function of their corresponding respective antennas.

In another embodiment of the invention, not shown, antenna planes and earth planes are constructed in accordance with conventional multilayer techniques, with which the antenna planes are pressed onto both sides of an intermediate earth plane, and where a transit hole is provided for passing signal conductors and earth conductors between respective antenna sides.

In the case of the described example, the incident microwave signal is passed, via conductors 15, 16, to the modulation components, e.g. the diodes 17, 18, whose impedance varies in accordance with a pattern from the memory register in the circuit 19.

In the illustrated case, one of the modulation components is supplied via a low-frequency signal conductor 20 that connects one side of the antenna to the other side thereof. In another embodiment, not shown, this signal conductor may carry microwaves from one side to the other, so as to enable a common modulation component to be used.

When the transponder is powered by a battery 21, e.g. when it is not powered by microwaves or low-frequency electromagnetic fields, it can be positioned concentrically with the antennas and inwardly of the radiating edges of the antenna elements. The lateral extension of the transponder will therewith be smaller, without disturbing or impairing its function.

Figure 3:
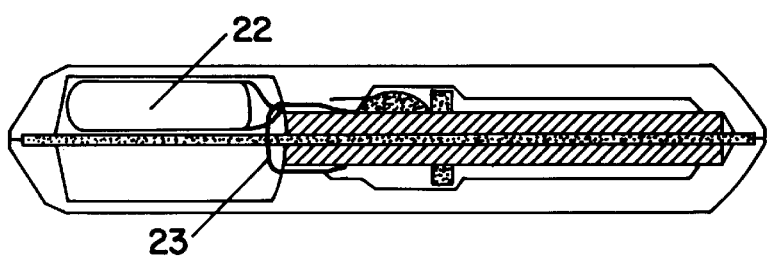
FIG. 3 illustrates another exemplary embodiment of the invention.

FIG. 3 illustrates an embodiment in which a battery 22 is positioned on one side of the antenna elements, so as to obtain a construction similar to a credit card. The solution and function in other respects are the same as that described with reference to FIG. 2. Transponder data is passed between the antennas via the intermediate connection 23, which may be a wire conductor as shown, or may be a penetrating-plating when the antennas have the form of multilayer cards.

Although the invention has been describe with reference to various embodiments thereof, it will be understood by the person skilled in this art that the structural design of the transponders may be varied.

These illustrated embodiments do not therefore limit the scope of the present invention, since they can be modified within the scope of the following claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transponder comprising:
   at least two patch antennas for reflecting transponder data as information sidebands of a microwave signal received from a reading unit,
   wherein the two antennas are parallel to, but oppositely directed from one another,
   wherein said at least two antennas act against at least one intermediate earth plane, and
   wherein said at least two patch antennas are linearly polarized so that their polarization direction is rotated through 90° in relation thereto.

2. A transponder according to claim 1, wherein each of the two patch antennas has a respective modulation and detection circuit controlled from a common application-specific integrated circuit through a low-frequency signal conductor.

3. A transponder according to claim 2, wherein each path antenna acts against a common earth plane from opposite directions.

4. A transponder according to claim 2, wherein each of the patch antennas acts against its respective earth plane, said earth planes being separated from one another by a foil so as to be substantially adjacent to one another.

5. A transponder according to claim 2, wherein the transponder is read with a circular-polarized microwave signal from the reading unit.

6. A transponder according to claim 2,
   wherein the transponder comprises a single unit that includes electronics and includes a memory register to which modulation units having modulation and detection circuits are connected, and
   wherein each of said patch antennas is connected to a corresponding modulation unit.

7. A transponder according to claim 2,
   wherein the transponder includes a single unit that includes electronics and a memory register;
   wherein a single modulation unit containing modulation and detection circuits is connected to said unit; and
   wherein both patch antennas are connected to said modulation unit.

8. A transponder according to claim 1, wherein each patch antenna acts against a common earth plane from opposite directions.

9. A transponder according to claim 8, wherein the transponder is read with a circular-polarized microwave signal from the reading unit.

10. A transponder according to claim 8,
    wherein the transponder comprises a single unit that includes electronics and includes a memory register to which modulation units having modulation and detection circuits are connected, and
    wherein each of said patch antennas is connected to a corresponding modulation unit.

11. A transponder according to claim 8,
    wherein the transponder includes a single unit that includes electronics and a memory register;
    wherein a single modulation unit containing modulation and detection circuits is connected to said unit; and
    wherein both patch antennas are connected to said modulation unit.

12. A transponder according to claim 1, wherein each patch antenna acts against its respective earth plane, said earth planes being separated from one another by a foil so as to be substantially adjacent to one another.

13. A transponder according to claim 12, wherein the transponder is read with a circular-polarized microwave signal from the reading unit.

14. A transponder according to claim 12,
    wherein the transponder comprises a single unit that includes electronics and includes a memory register to which modulation units having modulation and detection circuits are connected, and
    wherein each of said patch antennas is connected to a corresponding modulation unit.

15. A transponder according to claim 12,
    wherein the transponder includes a single unit that includes electronics and a memory register;
    wherein a single modulation unit containing modulation and detection circuits is connected to said unit; and
    wherein both patch antennas are connected to said modulation unit.

16. A transponder according to claim 1, wherein the transponder is read with a circular-polarized microwave signal from the reading unit.

17. A transponder according to claim 16,
    wherein the transponder comprises a single unit that includes electronics and includes a memory register to which modulation units having modulation and detection circuits are connected, and
    wherein each of said patch antennas is connected to a corresponding modulation unit.

18. A transponder according to claim 16,
    wherein the transponder includes a single unit that includes electronics and a memory register;
    wherein a single modulation unit containing modulation and detection circuits is connected to said unit; and wherein both patch antennas are connected to said modulation unit.

19. A transponder according to claim 1, wherein the transponder comprises a single unit that includes electronics, and includes a memory register to which modulation units having modulation and detection circuits are connected, and wherein each of said at least two patch antennas are connected to a corresponding modulation unit.

20. A transponder according to claim 19, wherein the transponder includes a single unit that includes electronics and a memory register;

wherein a single modulation unit containing modulation and detection circuits is connected to said unit; and wherein both patch antennas are connected to said modulation unit.

21. A transponder according to claim 1, wherein the transponder comprises a single unit that includes electronics and a memory register; wherein one modulation unit having modulation and detection circuits is connected to said unit; and wherein each path antenna is connected to said single modulation unit.

* * * * *